April 21, 1959 — F. GLOECKNER — 2,882,619
ARTICLE DEMONSTRATION DEVICE
Filed May 15, 1958 — 2 Sheets-Sheet 1

INVENTOR
FREDERICK GLOECKNER
BY
ATTORNEY

April 21, 1959  F. GLOECKNER  2,882,619
ARTICLE DEMONSTRATION DEVICE
Filed May 15, 1958  2 Sheets-Sheet 2

INVENTOR
FREDERICK GLOECKNER
BY Raymond Wheaton
ATTORNEY

United States Patent Office 2,882,619
Patented Apr. 21, 1959

2,882,619

ARTICLE DEMONSTRATION DEVICE

Frederick Gloeckner, Philadelphia, Pa., assignor to The Winchell Co., a corporation of Pennsylvania Application May 15, 1958, Serial No. 735,464

2 Claims. (Cl. 35—51)

This invention relates to an article demonstration device which is eminently suited for depicting details of a complex object or mechanism which, when illustrated by conventional drawings requires the showing of a large number of cross sections.

There have been many previous attempts to simplify such graphical representations by the superimposition of partial cut-out views of such objects or mechanisms, as exemplified by the rather early disclosures of the patents to Mitchell, No. 687,570, dated November 26, 1901 and Joyce, No. 1,578,895, dated March 30, 1926. It is important to observe that in the portrayals of these patents, the superimposed portions of the objects depicted on the base sheets and overlay sheets are arranged in registry with the result that no appreciable three dimensional effect will be produced.

In accordance with the present invention, the article demonstration device comprises a base sheet bearing the representation of an object, at least one overlay sheet bearing a portion only of the representation of the object and having a cut-out area through which a portion of the base sheet representation can be viewed, and binding means assembling the sheets for superimposition with their representations slightly out of registry to produce a substantial three dimensional effect. A plurality of overlay sheets are preferably employed depicting different portions respectively of the base sheet representation and having different cut-out areas respectively, through which unobscured portions of the base sheet representation can be viewed. Similar portions of the overlay sheets are bound to produce an out-of-registry relationship when superimposed on one another and when superimposed on the base sheet.

The one or more overlay sheets will preferably be bound between two base sheets each of which bears a representation of the object, the opposite surfaces of each such overlay sheet bearing portions only of the representations of the base sheets respectively, through which unobscured portions of the base sheet representations can be viewed.

A more complete understanding of the invention will follow a detailed description of the accompanying drawing wherein.

The article demonstration device has been depicted for purposes of illustration in conjunction with a book having nine pages secured together by binding means such as staples 20. On page two of the book depicted in the left half of Fig. 1, there is a representation of a motor driven hoist having portions broken away. On page three of the book as depicted in the right half of Fig. 1 will be seen a composite representation made up of a representation appearing on page nine overlaid by pages seven, five and three bearing portions only of the representation of the object shown on page nine and having cut-out areas through which portions of the page nine representation can be viewed together with portions of the representations borne by pages seven and five.

Figures 2, 3:
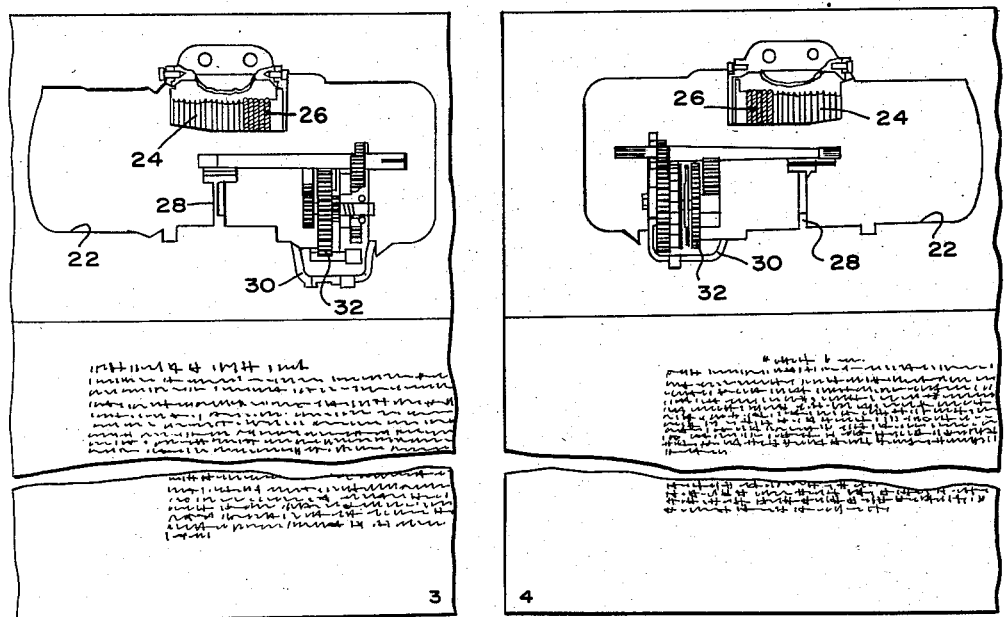
Figs. 2, 3, 4 and 5 are plan views of individual pages three, four, six and seven respectively, removed from the book.

Fig. 2 of the drawing depicts page three of the book containing a cut-out area 22 of the general configuration of the representation on page nine, together with portions intended to overlie the representation on page nine to show such portions as a cable drum 24, a cable 26, a bearing support 28, a housing 30 and gearing 32. The manner in which the book is bound provides an out of registry relationship between the overlay sheets or pages such as page three with respect to the base sheets, such as page nine. By virtue of this failure to register by a slight degree, the three dimensional effect produced by the thickness of the material constituting the pages is amplified by the optical illusion produced by this lack of registry.

Page four of the book, depicted in Fig. 3, is of course, the view of the reverse side of the sheet shown in Fig. 2. Consequently, the outline 22 of the cut-out is identical with that of Fig. 2 and whereas the shape of the overlay portion is also the same as in Fig. 2, the object representation is somewhat different to show different portions of the object broken away, for cooperation with the representation appearing on page two of the book depicted in the left half of Fig. 1. It will be understood that when the book is open to pages four and five, the representation of page four shown in Fig. 3 will be superimposed upon the representation of page two shown in Fig. 1.

Figure 1:
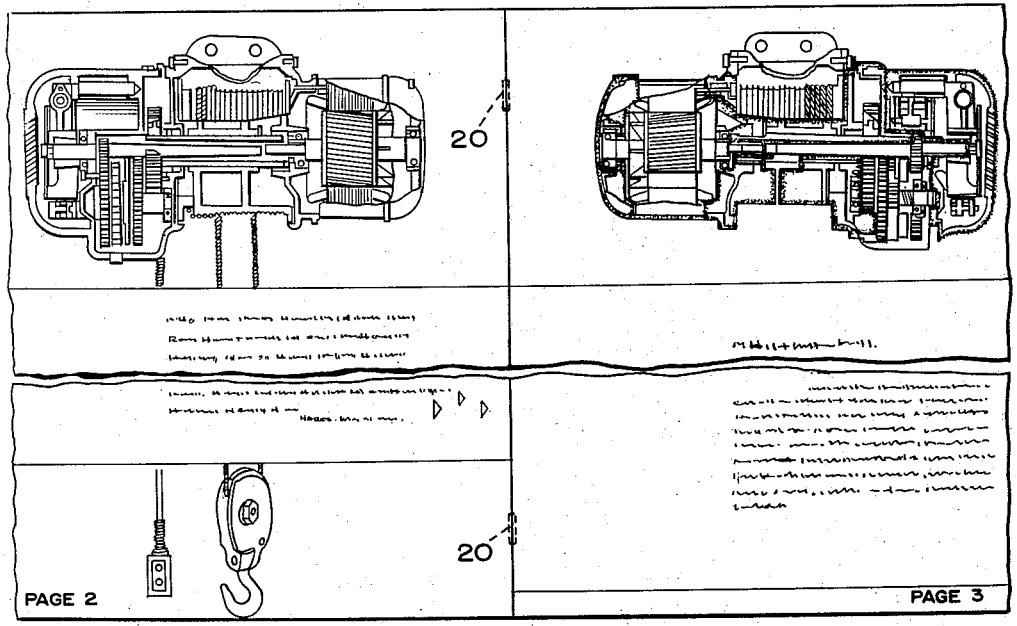
Fig. 1 is a plan view of a book embodying the present invention open at pages two and three.
Figure 4:
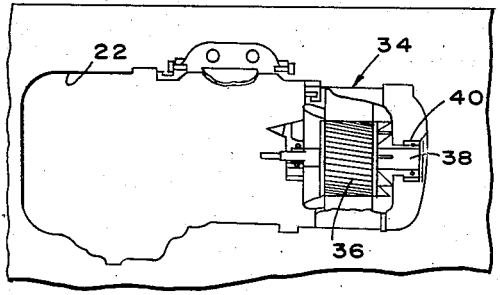
Figure 7:
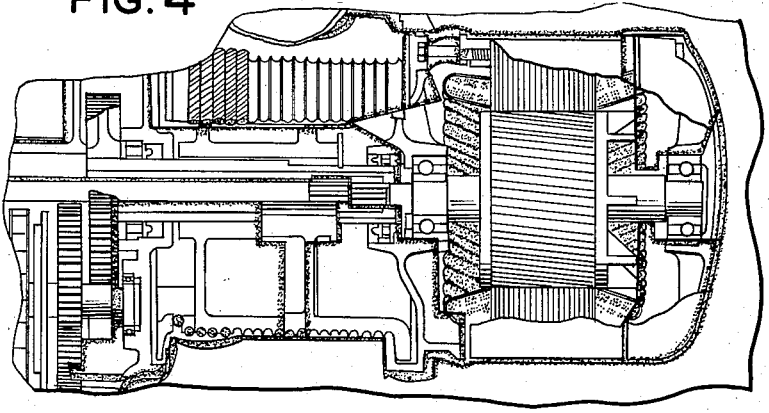
Fig. 7 is a fragmentary plan view depicting page six and portions of pages two and four underlying it.

When the book is opened to pages six and seven, the representation of page six shown in Fig. 4 will also be superimposed upon the representations of pages two and four shown in Figs. 1 and 3 respectively. As shown in Fig. 4, the cut-out outline 22 appears in conjunction with a representation of portions of the motor 34 including its rotor 36, its shaft 38 and bearings 40. The combined effect of the superimposition of pages four and six upon page two has been illustrated in Fig. 7 wherein close examination will show the several representations to be slightly out of registry to emphasize the three dimensional effect.

Figure 6:
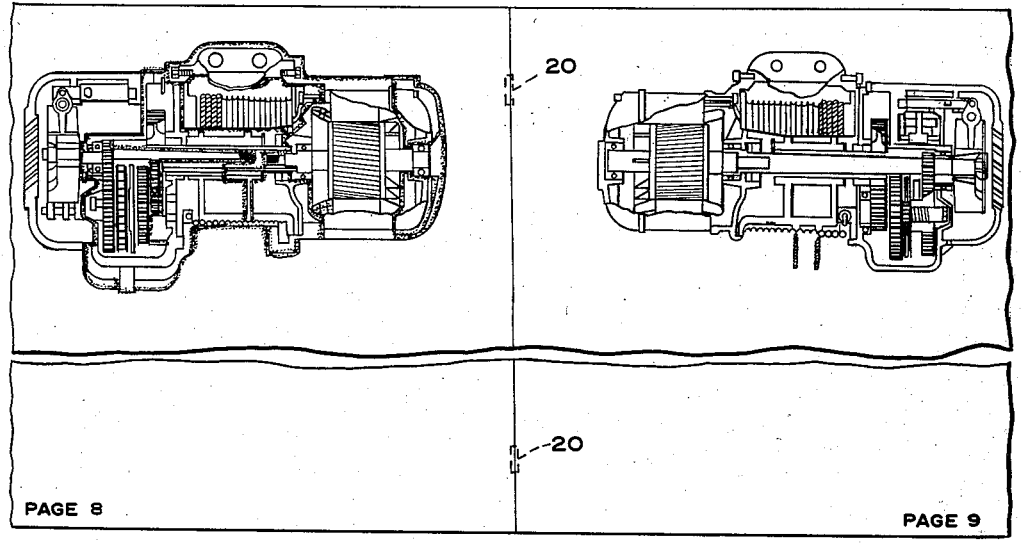
Fig. 6 is a plan view of the same book opened at pages eight and nine.

Fig. 6 of the drawing shows the conditions appearing when the book is opened to pages eight and nine under which conditions there is a superimposition of the representations of pages two, four, six and eight at the left side of this figure. The showing of page nine depicted at the right side of Fig. 6 indicates the graphical representation appearing on this base sheet.

Figure 5:
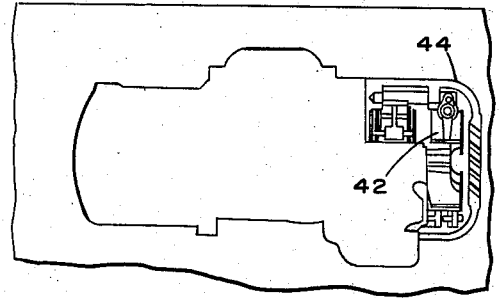

Fig. 5 depicts page seven of the book illustrating a braking mechanism 42 and a portion of its housing 44.

The concept of the present invention is applicable to many types of objects requiring display for presentation to individuals or groups for such purposes as teaching, advertising and analysis, among others.

It will be understood that the subject matter depicted by each page will be slightly out of registry with the corresponding subject matter appearing on each of the pages showing therethrough to produce the desired three dimensional illusion. This will become evident from an inspection of the right hand page of Fig. 1, the left hand page of Fig. 6, and Fig. 7, where pages have been illustrated in superimposition. This deliberate out-of-registry condition has been accentuated for purposes of clarification in the somewhat enlarged showing of Fig. 7 by the use of stippling to indicate some of the areas in which the misalignment is most pronounced. In these areas certain portions of the same elements can be seen on more than one of the superimposed pages, relatively displaced in one or two dimensions to produce a very attractive and realistic three dimensional effect.

Accordingly, there should be no limitation imposed upon the accompanying claims by the specific form of the invention shown and described for purposes of illustration.

I claim:

1. An article demonstration device comprising a base sheet bearing the representation of an object, an overlay sheet bearing a portion only of said representation of said object and having a cut-out area through which a portion of said base sheet representation can be viewed, and binding means assembling said sheets for superimposition with their representations slightly out of registry to produce a three dimensional effect, said overlay sheet being bound between said base sheet and a second base sheet bearing another representation of said object, and opposite surfaces of said overlay sheet bearing portions only of the representations of said base sheets respectively.

2. An article demonstration device as set forth in claim 1 wherein a plurality of overlay sheets are bound between said base sheets and bear different portions respectively, of said base sheet representations and have different cut-out areas respectively, through which unobscured portions of said base sheet representations can be viewed.

References Cited in the file of this patent

UNITED STATES PATENTS

| | | |
|---|---|---|
| 1,578,895 | Joyce | Mar. 30, 1926 |
| 2,151,055 | Stark | Mar. 21, 1939 |
| 2,560,658 | Pareto | July 17, 1951 |